(12) United States Patent
Venkatraman et al.

(10) Patent No.: US 10,165,541 B2
(45) Date of Patent: *Dec. 25, 2018

(54) ENHANCING POSITIONING VIA MEASUREMENT BATCHING

(71) Applicant: QUALCOMM Incorporated, San Diego, CA (US)

(72) Inventors: Sai Pradeep Venkatraman, Santa Clara, CA (US); Ashok Bhatia, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/409,843

(22) Filed: Jan. 19, 2017

(65) Prior Publication Data

US 2018/0192252 A1 Jul. 5, 2018

Related U.S. Application Data

(63) Continuation of application No. 15/398,580, filed on Jan. 4, 2017.

(51) Int. Cl.
*H04W 64/00* (2009.01)
*H04W 4/90* (2018.01)
*H04W 4/02* (2018.01)
*G01S 5/02* (2010.01)
*G01S 5/06* (2006.01)
(Continued)

(52) U.S. Cl.
CPC .......... *H04W 64/00* (2013.01); *G01S 5/0236* (2013.01); *G01S 5/0252* (2013.01); *G01S 5/06* (2013.01); *H04W 4/029* (2018.02); *H04W 4/90* (2018.02); *H04W 64/003* (2013.01); *H04W 88/02* (2013.01)

(58) Field of Classification Search
CPC ..... H04W 4/02; H04W 4/0231; H04W 4/025; H04W 4/043; H04W 4/22; H04W 64/00; H04W 64/006; G01C 21/206; G01S 19/11; G01S 1/02; G01S 1/042; G01S 1/68; G01S 5/0063; G01S 5/0226; G01S 5/0236; G01S 5/026
See application file for complete search history.

(56) References Cited

U.S. PATENT DOCUMENTS

| 2002/0135510 A1* | 9/2002 | Bruno ..... G01S 19/05 342/357.42 |
| 2011/0034179 A1* | 2/2011 | David ..... G01S 5/0236 455/456.1 |

(Continued)

OTHER PUBLICATIONS

King T., et al., "Compass: A Probabilistic Indoor Positioning System Based on 802.11 and Digital Compasses," Proceedings of the First ACM International Workshop on Wireless Network Testbeds, Experimental Evaluation and Characteristics (WiNTECH), Sep. 2006, pp. 34-40.

*Primary Examiner* — George Eng
*Assistant Examiner* — Umair Ahsan
(74) *Attorney, Agent, or Firm* — Hunter Clark PLLC

(57) ABSTRACT

Example methods, apparatuses, and/or articles of manufacture are disclosed herein that may be utilized, in whole or in part, to facilitate and/or support one or more operations and/or techniques for enhancing positioning, which may include E911 positioning, via measurement batching, such as for use in or with mobile communication devices, for example.

30 Claims, 6 Drawing Sheets

(51) Int. Cl.
*H04W 4/029* (2018.01)
*H04W 88/02* (2009.01)

(56) References Cited

U.S. PATENT DOCUMENTS

| | | | |
|---|---|---|---|
| 2012/0066035 A1* | 3/2012 | Stanger | G06Q 30/0207 |
| | | | 705/14.1 |
| 2012/0194383 A1 | 8/2012 | Kawaguchi et al. | |
| 2013/0310081 A1 | 11/2013 | Chu | |
| 2015/0133173 A1* | 5/2015 | Edge | G01S 1/66 |
| | | | 455/456.6 |
| 2016/0047657 A1* | 2/2016 | Caylor | G01C 21/005 |
| | | | 701/521 |
| 2016/0066157 A1* | 3/2016 | Noorshams | G01C 21/206 |
| | | | 455/457 |
| 2016/0131733 A1 | 5/2016 | Do et al. | |
| 2016/0205513 A1 | 7/2016 | Choudhry | |
| 2017/0070873 A1* | 3/2017 | Pon | H04W 4/22 |
| 2018/0192391 A1 | 7/2018 | Venkatraman et al. | |

\* cited by examiner

ENHANCING POSITIONING VIA MEASUREMENT BATCHING

CROSS REFERENCE TO RELATED APPLICATION

This application is a Continuation Application of U.S. Non-Provisional patent application Ser. No. 15/398,580, filed Jan. 4, 2017, and entitled "ENHANCING POSITIONING VIA MEASUREMENT BATCHING," assigned to the assignee hereof and expressly incorporated herein by reference in its entirety.

BACKGROUND

1. Field

The present disclosure relates generally to position or location estimations of mobile communication devices and, more particularly, to enhancing positioning via measurement batching for use in or with mobile communication devices.

2. Information

Mobile communication devices, such as, for example, cellular telephones, portable navigation units, laptop computers, personal digital assistants, or the like are becoming more common every day. Certain mobile communication devices, such as, for example, location-aware cellular telephones, smart telephones, or the like may assist users in estimating their geographic locations by providing positioning assistance parameters obtained or gathered from various systems. For example, in an outdoor environment, certain mobile communication devices may obtain an estimate of their geographic location or so-called "position fix" by acquiring wireless signals from a satellite positioning system (SPS), such as the global positioning system (GPS) or other like Global Navigation Satellite Systems (GNSS), cellular base station, etc. via a cellular telephone or other wireless communications network. Acquired wireless signals may, for example, be processed by or at a mobile communication device, and its location may be estimated using known techniques, such as Advanced Forward Link Trilateration (AFLT), base station identification, cell tower triangulation, or the like.

In an indoor or like environment, such as urban canyons, for example, mobile communication devices may be unable to reliably receive or acquire satellite or like wireless signals to facilitate and/or support one or more position estimation techniques. For example, signals from an SPS or other wireless transmitters may be attenuated or otherwise affected in some manner (e.g., insufficient, weak, fragmentary, etc.), which may at least partially preclude their use for position estimations. At times, a mobile communication device may obtain a position fix by measuring ranges to three or more terrestrial wireless transmitter devices, such as cellular base stations, access points, etc. positioned at known locations. Ranges may be measured, for example, by obtaining a Media Access Control identifier (MAC ID) address from wireless signals received from suitable access points and measuring one or more characteristics of received signals, such as signal strength, round trip delay, or the like.

At times, a position fix of a mobile communication device may, for example, be obtained in connection with one or more positioning tiles. For example, a number of wireless transmitters, indoor or otherwise, may be grouped into a geographically-bounded area to comprise and/or be defined via a so-called "positioning tile" or simply "tile." A tile may include positioning assistance parameters, such as locations, identities, etc. for a set of known wireless transmitters, for example, representative of and/or corresponding to a particular geographic area. As such, a mobile communication device may retrieve (e.g., access, download, etc. via a server, etc.) one or more tiles and may use one or more associated parameters to estimate its location within an area using one or more known techniques, such as, for example, techniques mentioned above (e.g., triangulation, radio heat map signature matching, range measurement, etc.). In some instances, positioning tiles may be employed to assist in localization of a mobile communication device in the event of an emergency call, such as in connection with an observed time difference of arrival (OTDOA) positioning session, as one possible example, in compliance with Emergency 911 (E911) mandates from the Federal Communication Commission (FCC). At times, however, accuracy of positioning, E911 or otherwise, employing positioning tiles may be affected, at least in part, by lack of requisite positioning assistance parameters within the tiles. For example, in some instances, a provided positioning tile may lack parameters for one or more wireless transmitters currently observed by a mobile communication device within an area of interest, which, in some instances, may result in less than sufficient position fixes.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
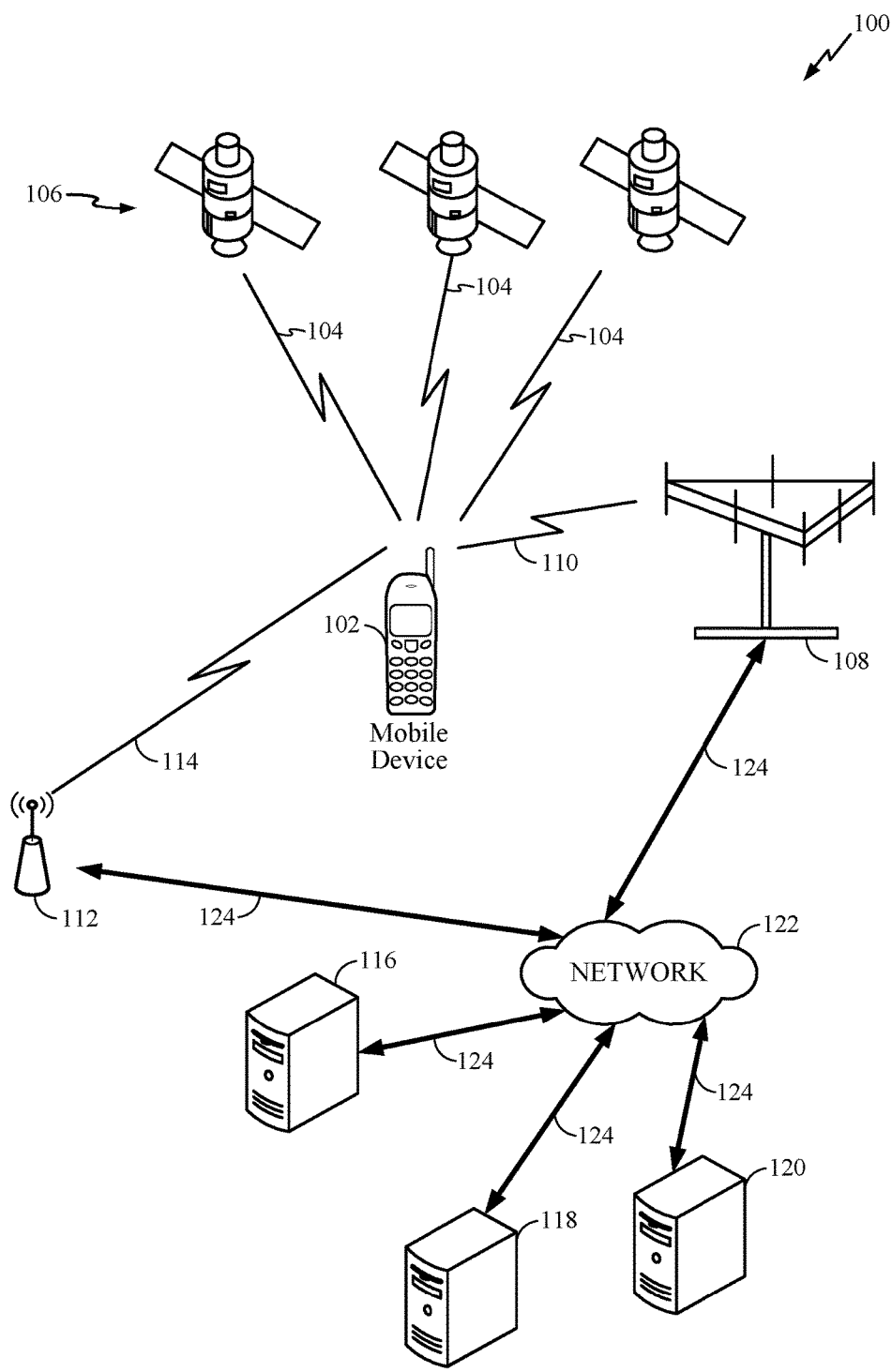
FIG. 1 is a schematic diagram illustrating features associated with an implementation of an example operating environment.

Example implementations relate to techniques for enhancing positioning via measurement batching. In one implementation, a method may comprise storing observations of radio frequency (RF) signals transmitted from one or more wireless transmitters in an area, the observations being stored based, at least in part, on one or more associations between the observations; and processing the observations to obtain an estimate of a location of a mobile device based, at least in part, on the one or more associations and responsive to a request for the estimate occurring subsequent to the storing the observations.

In another implementation, an apparatus may comprise means for storing observations of radio frequency (RF) signals transmitted from one or more wireless transmitters in an area, the observations being stored based, at least in part, on one or more associations between the observations; and means for processing the observations to obtain an estimate of a location of a mobile device based, at least in part, on the one or more associations and responsive to a request for the estimate occurring subsequent to the storing the observations.

In yet another implementation, an apparatus may comprise a communication interface coupled to a receiver of a mobile device to communicate with an electronic communications network and one or more processors coupled to a memory and to the communication interface, the communication interface and the one or more processors configured to store observations of radio frequency (RF) signals transmitted from one or more wireless transmitters in an area, the observations being stored based, at least in part, on one or more associations between the observations; and process the observations to obtain an estimate of a location of the mobile device based, at least in part, on the one or more associations and responsive to a request for the estimate occurring subsequent to the storing the observations.

In yet another implementation, a non-transitory storage medium may comprise instructions executable by a processor to store observations of radio frequency (RF) signals transmitted from one or more wireless transmitters in an area, the observations being stored based, at least in part, on one or more associations between the observations; and process the observations to obtain an estimate of a location of a mobile device based, at least in part, on the one or more associations and responsive to a request for the estimate occurring subsequent to the storing the observations.

In yet another implementation, a method may comprise batching, at a mobile device, multiple observations of RF signals transmitted from a plurality of unknown wireless transmitters in an area, the multiple observations being obtained while the mobile device is positioned at multiple different locations within the area; obtaining, via positioning assistance data, at least locations of at least some of the unknown wireless transmitters in the area, the locations being obtained subsequently to the batching the multiple observations; and estimating a location of at least one wireless transmitter absent from the positioning assistance data based, at least in part, on the subsequently obtained locations and the batched multiple observations.

In yet another implementation, an apparatus may comprise means for batching multiple observations of RF signals transmitted from a plurality of unknown wireless transmitters in an area, the multiple observations being obtained while the mobile device is positioned at multiple different locations within the area; means for obtaining, via positioning assistance data, at least locations of at least some of the unknown wireless transmitters in the area, the locations being obtained subsequently to the batching the multiple observations; and means for estimating a location of at least one wireless transmitter absent from the positioning assistance data based, at least in part, on the subsequently obtained locations and the batched multiple observations. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, and/or articles of manufacture are disclosed herein that may be implemented, in whole or in part, to facilitate and/or support one or more operations and/or techniques for enhancing positioning, which may include E911 positioning, for example, via measurement batching for use in or with mobile communication devices. As used herein, "mobile device," "mobile communication device," "location-aware mobile device," or like terms may be used interchangeably and refer to any kind of special purpose computing platform or apparatus that may from time to time have a position or location that changes. In some instances, a mobile communication device may, for example, be capable of communicating with other devices, mobile or otherwise, through wireless transmission or receipt of information according to one or more communication protocols. As a way of illustration, special purpose mobile communication devices, which may herein be called simply mobile devices, may include, for example, cellular telephones, smart telephones, personal digital assistants (PDAs), laptop computers, personal entertainment systems, tablet personal computers (PC), personal audio or video devices, personal navigation devices, radio heat map generation tools, or the like. It should be appreciated, however, that these are merely examples of mobile devices that may be used, at least in part, to implement one or more operations and/or techniques for enhancing positioning via measurement batching, and that claimed subject matter is not limited in this regard. It should also be noted that the terms "position" and "location" may be used interchangeably herein.

As alluded to previously, at times, a position fix of a mobile device may, for example, be obtained based, at least in part, on positioning assistance data that may be selectively provided to the mobile device, such as by a navigation system, location or like server, or the like. In some instances, positioning assistance data may comprise, for example, one or more parameters descriptive of attributes of wireless transmitters (e.g., Wi-Fi access points, cellular base stations, etc.) positioned at known locations. These attributes may include, for example, MAC addresses, cellular identification numbers (Cell IDs), transmission power levels, characteristics of wireless signals indicative of received signal strength (e.g., RSSI, etc.), round-trip delay times (e.g., RTT, etc.), etc., just to provide a few examples. In addition, at times, positioning assistance parameters may comprise, for example, electronic digital map-related parameters (e.g., for additional context, etc.), radio heat map values, or the like, such as for an area of interest, indoor or otherwise. Of course, these are merely examples of positioning assistance parameters, and claimed subject matter is not so limited. With the knowledge of one or more attributes of wireless transmitters, a mobile device may then estimate its location using one or more suitable approaches, as was indicated. One technique for obtaining positioning assistance data for a mobile device may include, for example, accessing the data via a server (e.g., location server, positioning assistance server, etc.), such as through a selection of a Uniform Resource Locator (URL). Another possible technique may include receiving positioning assistance parameters from a server in response to a location request, such as in connection with an applicable positioning session, for example.

As was also indicated, in some instances, a mobile device may obtain positioning assistance parameters via one or more so-called "positioning tiles." As used herein, the terms "positioning tile" or "tile" may be used interchangeably and refer to one or more parameters descriptive of attributes of wireless transmitters grouped with respect to one or more predefined geographically-bounded areas of uniform or non-uniform dimensions. Such attributes may include, for example, locations, transmission power levels (e.g., RSSI, etc.), timing characteristics (e.g., RTT, etc.), unique identifiers (e.g., Wi-Fi MAC address, Cell ID, etc.), etc. of wireless transmitters, such as located within and/or proximate to a particular geographically-bounded area. In operative use, a mobile device may, for example, perform a "scan," such as an active scan, passive scan, etc. of an area to acquire signals transmitted by proximate or "visible" wireless transmitters within the area and/or detect particular parameters encoded in the acquired signals (e.g., unique identifiers, etc.). By way of explanation, an active scan may, for example, be performed via transmitting one or more requests, such as in the form of one or more unicast packets and receiving one or more responses from one or more proximate wireless transmitters, and a passive scan may, for example, be performed by "listening" for or discovering wireless signals broadcasted by proximate wireless transmitters, such as without transmitting a request. These or like scans are generally known and need not be described here in greater detail. Having performed a scan, a mobile device may, for example, request one or more positioning tiles, such as covering an area of a rough location of the mobile device, which may be determined, at least in part, via a location of a serving wireless transmitter (e.g., a serving cellular base station, Wi-Fi access point, etc.), such as via Cell ID and/or enhanced Cell ID positioning, current or last known GNSS position fix, etc., just to illustrate a few possible examples.

Continuing with the above discussion, positioning tiles may, for example, be provided and/or made available to a mobile device via any suitable technology, such as by a location server or any other suitable server (e.g., a navigation server, etc.) and/or entity. By way of example but not limitation, at times, Zero Power Positioning (ZPP) technology proprietary to Qualcomm® may, for example, be employed herein, in whole or in part. For example, in some instances, one or more positioning tiles may be provided and/or made available to a mobile device via a third party server, such as via one or more communication links and/or upon a request for a location service, as one possible example. By way of another example but not limitation, at times, Qualcomm®'s proprietary technology capable of providing one or more positioning tiles may include, for example, a global terrestrial positioning (GTP) and/or terrestrial downlink positioning (TDP) protocol and/or approach. Claimed subject matter is not so limited, of course. For example, any other suitable technology and/or approach capable of facilitating and/or supporting timely access to and/or download of one or more positioning tiles may be utilized, in whole or in part. One or more positioning tiles may be used, at least in part, by a mobile device to obtain estimated locations of one or more observed or "visible" wireless transmitters, such as via corresponding Cell-IDs or other parameters tagged to respective transmitter locations within the tiles, for example.

Thus, based, at least in part, on its rough location as well as locations and/or parameters of one or more wireless transmitters obtained via a positioning tile, a mobile device may, for example, be capable of computing a position fix using one or more appropriate techniques, as discussed above. At times, a mobile device may transmit one or more parameters detected via a scan to a server along with a request to compute a position fix, such as without requesting and/or downloading a tile, for example. In response, a server may, for example, transmit one or more messages to a mobile device including a position fix of the mobile device. In some instances, a response message from a server may also reveal one or more available tiles that may be used, at least in part, for obtaining future position fixes within an area proximate to an estimated location, for example. If desired or otherwise appropriate, a mobile device may, for example, select to download one or more revealed tiles and may locally store these or other tiles for use in one or more future positioning operations. It should be noted that "wireless transmitters" and "transmitters" may be used interchangeably herein, and may be capable of transmitting and/or receiving wireless signals, depending on an implementation.

As was also indicated, in some instances, positioning tiles may facilitate and/or support positioning for one or more emergency services, such as E911 emergency services, for example, dispatching an appropriate first responder (e.g., fire, police, ambulance, etc.) to a location of a mobile device in response to a 911 emergency call originating from the mobile device. Thus, in response to an emergency 911 call to a Public Safety Answering Point (PSAP), for example, the PSAP may initiate operations for determining an estimated location of an emergency caller for dispatch of a public safety service. Here, a mobile device may, for example, receive from a location server a message comprising a location request, such as in response to a detection of an emergency event at a PSAP. In response to this message, a mobile device may, for example, initiate an E911 positioning session, such as obtain one or more observations and access and/or download one or more positioning tiles for computation of a position fix using one or more appropriate techniques (e.g., trilateration, etc.). In this context, "observation" refers to a measured attribute or characteristic of a wireless signal transmitted by a wireless transmitter and acquired by an observing receiver or other sensor co-located with a mobile device. In some instances, one or more observations may include, for example, one or more measurements of times of arrival (TOAs), time differences of arrival (TDOAs), RSSIs, RTTs, etc. of wireless signals transmitted by proximate wireless transmitters and acquired at a receiver of a mobile device, though claimed subject is not so limited. For example, at times, one or more observations may comprise, for example, one or more TOAs of CDMA pilot measurements in AFLT. Having obtained (e.g., from a mobile device, etc.) and/or computed (e.g., on a server, etc.) a position fix, a location server may, for example, communicate the position fix to an appropriate PSAP, such as for dispatching an appropriate first responder to a mobile device's location.

Typically, during an E911 or other positioning session, however, such as initiated in response to receiving a message indicating an E911 emergency or like event (e.g., a location request, etc.), for example, a mobile device may primarily rely on parameters of wireless transmitters contained in one or more provided positioning tiles. Thus, at times, a mobile device may, for example, be unable to take additional advantage of one or more parameters comprising observations of wireless transmitters obtained prior to an E911 or other positioning session. For example, in some instances, a location server may not be aware of a number of wireless transmitters, such as newly-installed, moved, positioned deeply indoors, etc. within a particular area or a portion of an area and, as such, their respective parameters may be absent from a provided positioning tile. A mobile device, while being located in such an area, may nevertheless observe current signals transmitted from these transmitters, but may not be able to correlate their parameters with parameters in positioning assistance data provided via a tile due, at least in part, to their absence. As such, at times, signals from wireless transmitters currently observed by a mobile device may be of limited use in obtaining and/or refining a position fix, such as via trilateration based on locations of transmitters, for example, or like techniques. Thus, in some instances, such as if a positioning tile does not comprise parameters for a requisite number of currently observed wireless transmitters, for example, obtaining and/or refining a sufficiently accurate position fix may not be attainable. Accordingly, it may be desirable to develop one or more methods, systems, and/or apparatuses that may enable or otherwise improve mobile device localization-related services, which may include E911 emergency services, such as implemented in connection with one or more positioning tiling approaches, for example.

Thus, as will be described in greater detail below, in an implementation, a mobile device, while traveling within an area of interest, indoor or otherwise, may, for example, collect and/or store in a local memory observations of signals transmitted from proximate wireless transmitters, such as in one or more batches of corresponding measurements. In some instances, observations may, for example, be collected and/or stored prior to receiving a message initiating an applicable positioning session, such as a location or position fix request, 911 emergency call, positioning tile download, or the like. As will also be seen, at times, observations may, for example, be stored based, at least in part, on one or more associations between the observations, which may include time-related associations, location-related associations, parameter-related associations, or the like, or any combination thereof. In response to a request for a position fix, E911-related or otherwise, a mobile device may, for example, obtain an applicable positioning tile, as discussed above (e.g., via a GTP, TDP, etc. protocol), and may apply associated parameters to one or more stored observations to obtain and/or refine a position fix. For example, a mobile device may retrieve a particular measurement batch, or any combination thereof, and may compute a position fix utilizing past observations from unknown wireless transmitters, such as those absent from a provided tile, as a function of known wireless transmitters observed at the same or similar time, from the same or similar location, having the same or similar parameters, etc., or any combination thereof. Unknown and known wireless transmitters will be discussed in greater detail below. As such, at times, a mobile device may, for example, be capable of computing a sufficient position fix even if no parameters of unknown wireless transmitters were provided in a positioning tile, which may prove beneficial. In some instances, these or like approaches may reduce or eliminate obtaining additional observations subsequent to a request for a position fix, which may, for example, reduce time to first fix (TTFF), improve power consumption of a mobile device, or the like. At times, stored observations may, for example, be de-weighted as a function of age, discarded from a memory beyond a certain age, etc., such as to facilitate and/or support localization via one or more positioning tiles.

FIG. 1 is a schematic diagram illustrating features associated with an implementation of an example operating environment 100 capable of facilitating and/or supporting one or more processes and/or operations for enhancing positioning via measurement batching for use in or with a mobile device, such as a location-aware mobile device 102, for example. It should be appreciated that operating environment 100 is described herein as a non-limiting example that may be implemented, in whole or in part, in the context of various electronic communications networks or combination of such networks, such as public networks (e.g., the Internet, the World Wide Web), private networks (e.g., intranets), WWAN, wireless local area networks (WLAN, etc.), or the like. It should also be noted that claimed subject matter is not limited to indoor implementations. For example, at times, one or more operations or techniques described herein may be performed, at least in part, in an indoor-like environment, which may include partially or substantially enclosed areas, such as urban canyons, town squares, amphitheaters, parking garages, rooftop gardens, patios, or the like. At times, one or more operations or techniques described herein may be performed, at least in part, in an outdoor environment.

As illustrated, in an implementation, mobile device 102 may, for example, receive or acquire satellite positioning system (SPS) signals 104 from SPS satellites 106. In some instances, SPS satellites 106 may be from a single global navigation satellite system (GNSS), such as the GPS or Galileo satellite systems, for example. In other instances, SPS satellites 106 may be from multiple GNSS such as, but not limited to, GPS, Galileo, Glonass, or Beidou (Compass) satellite systems. In certain implementations, SPS satellites 106 may be from any one several regional navigation satellite systems (RNSS) such as, for example, WAAS, EGNOS, QZSS, just to name a few examples.

At times, mobile device 102 may, for example, transmit wireless signals to, or receive wireless signals from, a suitable wireless communication network. In one example, mobile device 102 may communicate with a cellular communication network, such as by transmitting wireless signals to, or receiving wireless signals from, one or more wireless transmitters capable of transmitting and/or receiving wireless signals, such as a base station transceiver 108 over a wireless communication link 110, for example. Similarly, mobile device 102 may transmit wireless signals to, or receive wireless signals from a local transceiver 112 over a wireless communication link 114. Base station transceiver 108, local transceiver 112, etc. may be of the same or similar type, for example, or may represent different types of devices, such as Wi-Fi access points, radio beacons, cellular base stations, femtocells, or the like, depending on an implementation. Similarly, local transceiver 112 may comprise, for example, a wireless transmitter and/or receiver capable of transmitting and/or receiving wireless signals. For example, as will be seen, at times, wireless transceiver 112 may be capable of obtaining one or more observations from one or more other terrestrial transmitters.

In a particular implementation, local transceiver 112 may be capable of communicating with mobile device 102 at a shorter range over wireless communication link 114 than at a range established via base station transceiver 108 over wireless communication link 110. For example, local transceiver 112 may be positioned in an indoor or like environment and may provide access to a wireless local area network (WLAN, e.g., IEEE Std. 802.11 network, etc.), wireless personal area network (WPAN, e.g., Bluetooth® network, etc.), or like local area networks. For example, in another example implementation, local transceiver 112 may comprise a femtocell or picocell capable of facilitating communication via link 114 according to an applicable cellular or like wireless communication protocol. Of course, it should be understood that these are merely examples of networks that may communicate with mobile device 102 over a wireless link, and claimed subject matter is not limited in this respect. For example, in some instances, operating environment 100 may include a larger number of base station transceivers 108, local transceivers 112, etc.

In an implementation, base station transceiver 108, local transceiver 112, etc. may communicate with servers 116, 118, or 120 over a network 122 via one or more links 124. Network 122 may comprise, for example, any combination of wired or wireless communication links. In a particular implementation, network 122 may comprise, for example, Internet Protocol (IP)-type infrastructure capable of facilitating or supporting communication between mobile device 102 and one or more servers 116, 118, 120, etc. via local transceiver 112, base station transceiver 108, etc. In another implementation, network 122 may comprise, for example cellular communication network infrastructure, such as a base station controller or master switching center to facilitate and/or support mobile cellular communication with mobile device 102. As was indicated, in some instances, network 122 may facilitate and/or support communications with a PSAP (not shown) or like entity, such as for purposes of initiating and/or implementing an E911 or like positioning session, for example. Servers 116, 118, and/or 120 may comprise any suitable servers or combination thereof capable of facilitating and/or supporting one or more operations and/or techniques discussed herein. For example, servers 116, 118, and/or 120 may comprise one or more location servers (e.g., Evolved Serving Mobile Location Server (E-SMLC), Secure User Plane Location Server/SUPL Location Platform (SUPL SLP), etc.), positioning assistance servers, navigation servers, map servers, crowdsourcing servers, network-related servers, or the like.

In particular implementations, and as also discussed below, mobile device 102 may have circuitry or processing resources capable of determining a position fix or estimated location of mobile device 102, rough or otherwise. For example, if satellite signals 104 are available, mobile device 102 may compute a position fix based, at least in part, on pseudorange measurements to four or more SPS satellites 106. Here, mobile device 102 may compute such pseudorange measurements based, at least in part, on pseudonoise code phase detections in signals 104 acquired from four or more SPS satellites 106. In particular implementations, mobile device 102 may receive from one or more servers 116, 118, or 120 positioning assistance data to aid in the acquisition of signals 104 transmitted by SPS satellites 106 including, for example, almanac, ephemeris data, Doppler search windows, just to name a few examples. If satellite signals 104 are unavailable, mobile device 102 may, for example, compute a position fix based, at least in part, on Cell ID, enhanced Cell ID, or like positioning. As discussed below, in some instances, mobile device 102 may, for example, compute its rough position based, at least in part, on these or like techniques (e.g., GNSS positioning, dead reckoning, etc.), such as for purposes of obtaining one or more positioning tiles, among other things.

In some implementations, mobile device 102 may obtain a position fix by processing wireless signals received from one or more terrestrial transmitters positioned at known locations (e.g., base station transceiver 108, local transceiver 112, etc.) using any one of several techniques, such as, for example, OTDOA, AFLT, or the like. In these techniques, a range from mobile device 102 may, for example, be measured to three or more of terrestrial transmitters based, at least in part, on one or more reference signals transmitted by these transmitters and received at mobile device 102. Here, servers 116, 118, or 120 may be capable of providing positioning assistance data to mobile device 102 including, for example, locations, identities, etc. of terrestrial transmitters to facilitate and/or support one or more applicable positioning techniques. At times, servers 116, 118, or 120 may include, for example, a base station almanac (BSA) indicating locations, identities, etc. of cellular base stations (e.g., base station transceiver 108, local transceiver 112, etc.) in one or more particular areas or regions associated with operating environment 100.

As alluded to previously, in particular environments, such as indoor or like environments (e.g., urban canyons, etc.), mobile device 102 may not be capable of acquiring or processing signals 104 from a sufficient number of SPS satellites 106 so as to perform a suitable positioning technique. Thus, optionally or alternatively, mobile device 102 may be capable of determining a position fix based, at least in part, on signals acquired from one or more local transmitters 112, such as femtocells, Wi-Fi access points, or the like. For example, mobile device 102 may obtain a position fix by measuring ranges to three or more local transceivers 112 positioned at known locations. In some implementations, mobile device 102 may, for example, measure ranges by obtaining a MAC address from local transceiver 112, as was also discussed.

In an implementation, mobile device 102 may, for example, receive positioning assistance data for one or more positioning operations from servers 116, 118, and/or 120. As was indicated, at times, positioning assistance data may include, for example, locations, identities, etc. of one or more local transceivers 112, base station transceivers 108, etc. positioned at known locations for measuring ranges to these transmitters. In some instances, positioning assistance data may include, for example, radio heat maps, context parameter maps, routeability graphs, positioning tiles, etc., just to name a few examples. Other assistance data may include, for example, electronic digital maps of indoor or like areas for display or to aid in navigation. A map may be provided to mobile device 102 as it enters a particular area, for example, and may show applicable features such as doors, hallways, entry ways, walls, etc., points of interest, such as bathrooms, pay phones, room names, stores, or the like. By obtaining a digital map of an indoor or like area of interest, mobile device 102 may, for example, be capable of overlaying its current location over the displayed map of the area so as to provide an associated user with additional context, frame of reference, or the like. The terms "positioning assistance data" and "navigation assistance data" may be used interchangeably herein.

According to an implementation, mobile device 102 may access navigation assistance data via servers 116, 118, and/or 120 by, for example, requesting such data through selection of a universal resource locator (URL). In particular implementations, servers 116, 118, and/or 120 may be capable of providing navigation assistance data to cover many different areas including, for example, floors of buildings, wings of hospitals, terminals at an airport, portions of a university campus, areas of a large shopping mall, etc., just to name a few examples. Also, if a memory or data transmission resources at mobile device 102 make receipt of positioning assistance data for all areas served by servers 116, 118, and/or 120 impractical or infeasible, a request for such data from mobile device 102 may, for example, indicate a rough or course estimate of a location of mobile device 102. Mobile device 102 may then be provided navigation assistance data covering, for example, one or more areas including or proximate to a roughly estimated location of mobile device 102. In some instances, one or more servers 116, 118, and/or 120 may facilitate and/or support providing one or more positioning tiles, such as for determining a position fix in connection with an E911 positioning session, for example, and may provide the position fix to an applicable PSAP via network 122, as was also indicated.

Even though a certain number of computing platforms and/or devices are illustrated herein, any number of suitable computing platforms and/or devices may be implemented to facilitate and/or support one or more techniques or processes associated with operating environment 100. For example, at times, network 122 may be coupled to one or more wired or wireless communication networks (e.g., WLAN, etc.) so as to enhance a coverage area for communications with mobile device 102, one or more base station transceivers 108, local transceiver 112, servers 116, 118, 120, or the like. In some instances, network 122 may facilitate and/or support femtocell-based operative regions of coverage, for example. Again, these are merely example implementations, and claimed subject matter is not limited in this regard.

Figure 2:
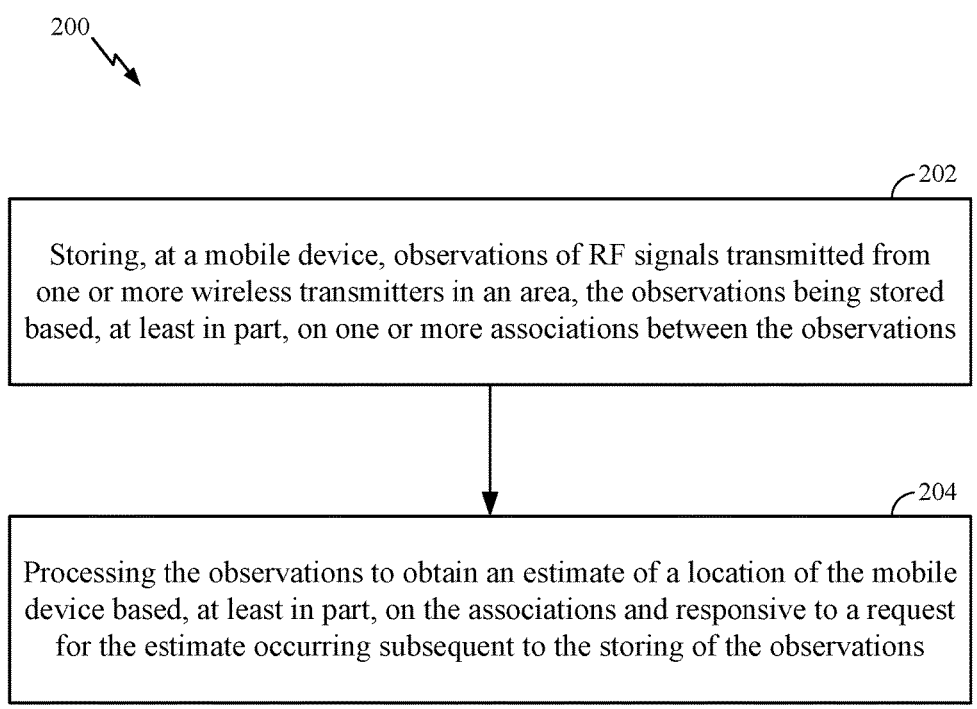
FIG. 2 is a flow diagram illustrating an implementation of an example process that may be performed to facilitate and/or support enhancing positioning via measurement batching.

With this in mind, attention is now drawn to FIG. 2, which is a flow diagram illustrating an implementation of an example process 200 that may be performed, in whole or in part, to facilitate and/or support one or more operations and/or techniques for enhancing positioning via measurement batching. As was indicated, at times, process 200 may be implemented, at least in part, via a location-aware mobile device, such as, for example, mobile device 102 of FIG. 1, though claimed subject matter is not so limited. For example, in some instances, one or more operations of process 200 may be implemented, at least in part, via a server device, such as one or more servers 116, 118, and/or 120 of FIG. 1, or any combination of a server device and a mobile device. It should be noted that information acquired or produced, such as, for example, input signals, output signals, operations, results, etc. associated with example process 200 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

Example process 200 may, for example, begin at operation 202 with storing, at a mobile device, observations of radio frequency (RF) signals transmitted from one or more wireless transmitters in an area, the observation being stored based, at least in part, on one or more associations between the observations. Observations may, for example, be collected and/or stored via a suitable host application or like process, such as a background process, as one possible example, dedicated or otherwise. A host application or like process may, for example, be provided to a user's mobile device by a suitable server, stored locally on a mobile device, etc. An application or like process may, for example, be activated, launched, downloaded, etc. upon user's turning on, rebooting, or activating a mobile device, entering an area of interest, upon request, user input, or the like. Thus, a mobile device, while traveling within an area of interest, indoor or otherwise, may, for example, observe, such as receive and/or acquire in connection with a scan (e.g., active, passive, etc.), for example, wireless signals from one or more proximate or "visible" wireless transmitters, such as one or more cellular base stations, Wi-Fi access points, Bluetooth® beacons, etc., or any combination thereof. In some instances, a mobile device may, for example, obtain and/or store one or more measurements originating from one or more on-board sensors, such as instead of or in addition to performing a scan. Sensor measurements may, for example, be associated and/or stored with signal observations, if appropriate and/or applicable, with reference to and/or based, at least in part, on a time of measurement sensing and/or signal observing, a particular location within an area, a particular type of a measurement (e.g., acceleration, etc.), or the like. On-board sensors may comprise, for example, one or more inertial sensors (e.g., accelerometers, gyroscopes, compasses, magnetometers, gravitometers, etc.), ambient environment sensors (e.g., ambient light detectors, radio frequency (RF) sensors, proximity sensors, piezo sensors, capacitance and/or resistance-based touch sensors, vibrational sensors, thermometers, etc.), or other sensors capable of measuring various states of a mobile device. These or like sensor measurements may, for example, be used, at least in part, to estimate locations of one or more wireless transmitters in an area of interest in a fashion similar to one or more approaches discussed herein (e.g., via correlating barometric pressure measurements of applicable wireless transmitters, etc.).

Having acquired wireless signals, a mobile device may, for example, decode particular parameters encoded in the wireless signals using one or more appropriate techniques. In some instances, parameters may comprise, for example, identities (e.g., Cell IDs, MAC addresses, etc.) of observed wireless transmitters as well as received signal strength-related measurements (e.g., RSSI, etc.), round-trip delay times-related measurements (e.g., RTT, etc.), or the like. Claimed subject matter is not limited to these particular measurements, of course. Any suitable measurements capable of facilitating and/or supporting obtaining a position fix of a mobile device via any appropriate technique may be used herein, in whole or in part, or otherwise considered. At times, observations may comprise, for example, observations obtained from one or more unknown wireless transmitters. In this context, "unknown" wireless transmitters refer to wireless transmitters locations and/or identities of which may not be known to a mobile device, such as at the time of observing and/or storing respective observations, for example, in the absence of applicable positioning assistance data, such as one or more parameters comprising a positioning tile covering a relevant area, as one possible example.

Figure 3:
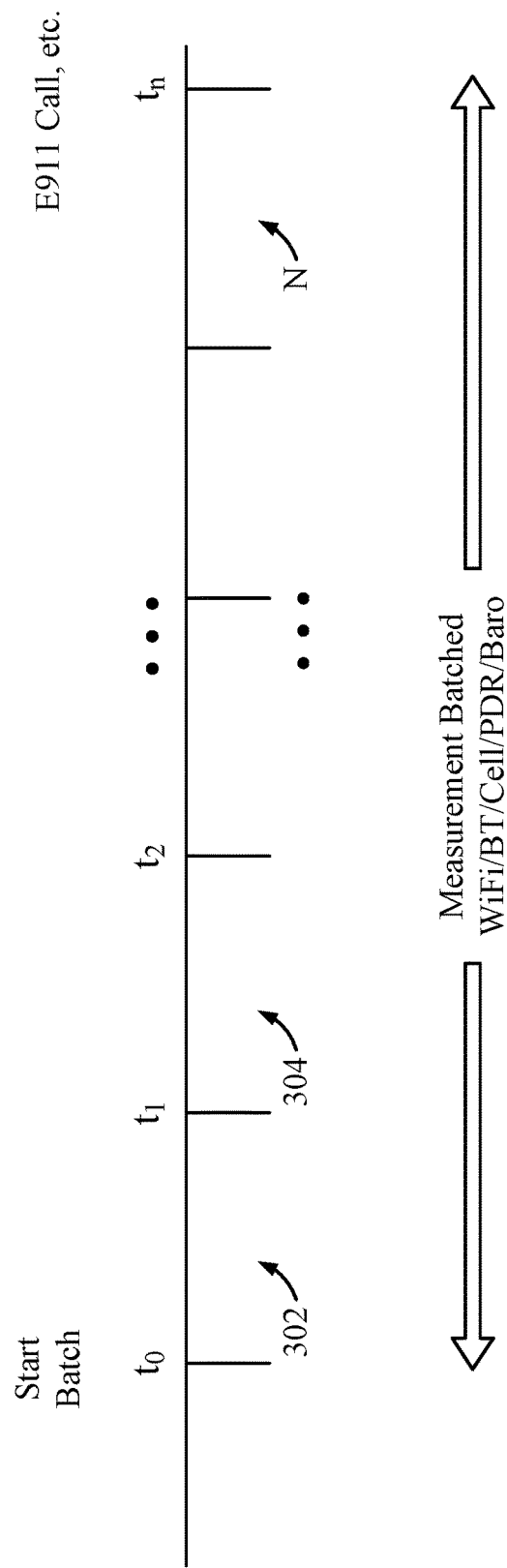
FIG. 3 is a schematic diagram of an implementation of an example measurement batching approach.

Continuing with the above discussion, a mobile device may, thus, store signal observations in a local memory, such as prior to a positioning session initiated via a location request or like event (e.g., a 911 emergency call, positioning tile download, etc.), for example. A mobile device may, for example, store observations in any suitable manner, such as in one or more measurements batches based, at least in part, on one or more associations between such observations, which may include time-related associations, location-related associations, parameter-related associations, or the like, or any combination thereof. For example, as illustrated in FIG. 3, in at least one implementation, observations may be time stamped, such as with a time and/or date at which signals were observed, and may be stored in batches of particular measurements (e.g., Wi-Fi, Bluetooth®, cellular, inertial, barometric, pedestrian dead reckoning, etc. sensor, etc.), illustrated generally as 302 through N. As also seen, at times, batches may, for example, be stored with reference to suitable time periods, illustrated generally as $t_0$-$t_1$, $t_1$-$t_2$, and so forth until a time $t_n$, which may correspond to a 911 call or like event (e.g., a location request, etc.) that may initiate a positioning session. Here, a time period may be determined, at least in part, experimentally and may be set, pre-defined, and/or configured (e.g., by a user, wireless service provider, etc.), for example, or otherwise dynamically defined in some manner depending on a particular environment, application, area, emergency and/or wireless service, mobile device, or the like. Thus, a time period may comprise a configurable parameter that may be based, at least in part, on user mobility, rate at which wireless scans are made, maximum allowed storage capacity, maximum number of observed wireless transmitters, maximum number of observed that can be stored, or the like. By way of example but not limitation, in one particular simulation or experiment, it appeared that a time period in a range between 100.0 seconds (e.g., for a faster-moving user) and 300.0 seconds (e.g., for a slower-moving user) may prove beneficial for enhancing positioning via measurement batching, including E911 or like positioning. Of course, details relating to a time period and/or particular measurements are intended as merely examples to which claimed subject matter is not limited.

Thus, as seen, in at least one implementation, observations may be associated or "linked" together, such as for storing in a suitable local memory via a number of measurement batches (e.g., in a buffer, etc.), for example, based, at least in part, on a time and/or date of the observations and/or with reference to one or more suitable time periods. As discussed below, these or like associations (e.g., location-related, parameter-related, etc.) may, for example, facilitate and/or support estimating locations of one or more currently observed wireless transmitters absent from provided positioning assistance data, such as a positioning tile. Namely, using one or more measurement batches and with the knowledge of locations of wireless transmitters obtained from a provided positioning tile, a mobile device may, for example, be capable of estimating locations of one or more unknown (e.g., absent from the tile, etc.) yet currently observed wireless transmitters as a function of past observations of known wireless transmitters. For example, in some instances, a location of one or more currently observed but unknown wireless transmitters comprising a particular stored measurement batch may be assumed to be associated or "linked with"—and, thus, proximate to—a location of one or more known wireless transmitters in the batch that were previously observed at the same time, as discussed below.

It should be noted that claimed subject matter is not limited to a particular association and/or assumption, of course. For example, as was indicated, in some instances, observations may be stored in measurement batches based, at least in part, on location-related associations, meaning that observations may be associated or "linked" together in a particular batch with reference to a particular location from which wireless signals were observed, such as in a similar fashion. Here, if a mobile device, while at a particular location within an indoor or like area of interest, observes signals from a number of wireless transmitters, for example, and subsequently visits the same location in the area or a location proximate to the area, these wireless transmitters, of transmitters observed from that or proximate location, may be linked or associated together, such as in a similar fashion via an appropriate measurement batch. As was also indicated, a times, observations may, for example, be stored in measurement batches based, at least in part, on parameter-related associations, meaning that observations may be associated or "linked" together in a particular batch with reference to one or more particular parameters that were observed (e.g., RSSI, RTT, etc.) from a particular location, as was also indicated. For this implementation, a mobile device, while traveling within an indoor or like area of interest, may link together wireless transmitters exhibiting the same or similar signaling (e.g., RSSI, etc.) or timing (e.g., RTT, etc.) characteristics in a similar fashion, but, at times, may limit batching to transmitters with a higher quality measurements (e.g., stronger signal strength, etc.) and/or invariant signal delays, for example.

In at least one implementation, observations may also be geo-tagged in a suitable manner, such as with appropriate geographic (e.g., latitude, longitude, etc.) or local coordinates, for example, while being collected and/or stored in one or more measurement batches. Here, a mobile device, such as while traveling within an area in which SPS signals may be reliably received or acquired, may, for example, correlate or associate locations of one or more currently observed proximate wireless transmitters with a current position fix obtained via an SPS, if applicable or available. In some instances, such as in SPS-denied environments (e.g., deep indoors, etc.), for example, a last known position fix obtained via an SPS may also be used, at least in part, to approximate and/or geo-tag locations of observed wireless transmitters, such as in connection with one or more dead reckoning or like techniques. For example, here, a mobile device may utilize one or more on-board sensors, such as an inertial sensor to estimate locations of observed wireless transmitters via incrementing a last known position fix using a known direction of travel and/or estimated speed over some known elapsed time. Of course, these are merely details to which claimed subject matter is not limited. For example, any other suitable sensor or combination of sensors may be utilized, at least in part, to estimate and/or geo-tag locations of one or more observed wireless transmitters. In addition, any other suitable approaches, such as Cell-ID positioning, Enhanced Cell-ID positioning, or the like may be also used, in whole or in part, to approximate and/or geo-tag locations of observed wireless transmitters.

According to an implementation, to facilitate and/or support localization via one or more positioning tiles, stored observations of RF signals may, for example, be de-weighted as a function of age, discarded from a local memory beyond a certain age, as was indicated. As an example of an age-type weighting, a particular characteristic (e.g., RSSI, RTT, etc.) of a wireless transmitter may, for example, be weighted by a factor that is inversely proportional to an expected distance traveled by a user in a measurement age or interval. For example, if there are three wireless transmitters, two of which are seen with a time lag of zero seconds at the time of positioning, and the third measurement is 10.0 seconds old and a user's speed is 5.0 meters per second, then that particular wireless transmitter may be de-weighted by a function of age as, for example, $K/(10*5/\wedge 2$, where K is a constant that may be determined experimentally and/or dynamically based, at least in part, on an associated wireless environment, mobile device, application, positioning protocol, etc., or any combination thereof. Claimed subject matter is not limited to these particular details, of course.

Referring back to example process 200 of FIG. 2, with regard to operation 204, the observations may, for example, be processed in some manner, such as to obtain an estimate of a location of the mobile device based, at least in part, on the associations and responsive to a request for the estimate occurring subsequent to the storing of the observations. For example, in response to initiation of a positioning session, such as triggered via a 911 call, location request, etc. subsequent to storing of observations (e.g., at a time $t_n$ of FIG. 3, etc.), a mobile device may obtain a relevant positioning tile, such as discussed above, and may access its local memory to retrieve one or more appropriate batches of stored observations in a suitable manner. More specifically, in an implementation, a mobile device may, for example, retrieve a particular measurement batch of stored observations via correlating one or more parameters of wireless transmitters contained within a provided positioning tile with one or more stored parameters of wireless transmitters within the batch. As a way of illustration, using example implementation of FIG. 3, a mobile device may, for example, retrieve batch 304 if MAC addresses, RSSIs, RTTs, etc. of one or more wireless transmitters comprising this particular batch correspond to MAC addresses, RSSIs, RTTs, etc. of one or more wireless transmitters contained in a provided positioning tile. Claimed subject matter is not so limited, of course.

Continuing with the above discussion, by way of another example, a mobile device may, for example, retrieve batch 302 if a time period $t_0$-$t_1$ is within a certain time threshold from a time of initiation of an applicable positioning session (e.g., an E911 positioning session, etc.), such as from a time $t_n$. Such a threshold may also be determined, at least in part, experimentally and may be set, pre-defined, and/or configured (e.g., by a user, wireless service provider, etc.), for example, or otherwise dynamically defined in some manner depending on a particular environment, application, area, emergency and/or wireless service, mobile device, or the like. By way of example but not limitation, in one particular simulation or experiment, it has been observed that a time threshold between 15.0 and 30.0 minutes prior to a time of initiation of a positioning session may prove beneficial for retrieving a measurement batch, for an E911 positioning session or otherwise. A time threshold may also account for a user's mobility, maximum storage capacity, etc., such as discussed above. Claimed subject matter is not limited to these particular examples, of course. In some instances, all or most stored measurement batches of past observations may, for example, be accessed and/or retrieved, such as to facilitate and/or support computing a position fix.

Continuing with operation 204 of FIG. 2, in an implementation, having retrieved an applicable batch of measurements, a mobile device may, for example, process observations within the batch so as to estimate locations of one or more currently observed but unknown wireless transmitters, such as those absent from a provided positioning tile, as was indicated. For example, at times, locations of one or more currently observed unknown wireless transmitters may be estimated as a function of past observations of known wireless transmitters associated or "linked" together with the unknown wireless transmitters via a particular batch. More specifically, in certain simulations or experiments, it has been observed that locations of one or more currently observed but unknown wireless transmitters comprising a particular stored measurement batch may be assumed to be proximate to locations of one or more known wireless transmitters within the batch, such as those that were previously observed at the same time, for example. Thus, in some instances, locations of one or more known (e.g., via a tile, etc.) wireless transmitters within a particular batch may, for example, be used as "proxy" locations of one or more unknown wireless transmitters comprising the same batch, such as for purposes of computing a position fix. Here, any suitable approaches, statistical or otherwise, capable of approximating unknown transmitter locations may be used, in whole or in part, or otherwise considered. For example, at times, a weighting approach emphasizing contribution of one or more stored observations of known wireless transmitters within a particular measurement batch to affect location estimations of one or more unknown wireless transmitters in the batch may, for example, be employed, in whole or in part. In some instances, a weighting approach may also account for a number of factors, such as wireless transmitter location uncertainty, observation uncertainty, observation age, signal characteristic (e.g., RSSI, RTT, etc.), user's mobility, etc., or any combination thereof. Of course, details relating to particular assumptions, observations, and/or approaches are intended as merely examples to which claimed subject matter is not limited. It should be appreciated that any of a variety of possible other approaches, statistical or otherwise, may be utilized to estimate unknown transmitter locations, such as, for example, a median, a mean, a mode, a percentile of mean, a number of instances, a ratio, a rate, a frequency, an entropy, mutual information, a division, a difference, etc., or any combination thereof.

In some instances, a mobile device may, for example, be capable of estimating locations of one or more currently observed but unknown wireless transmitters using their stored geo-tagged locations, such as in a similar fashion (e.g., as a function of known wireless transmitters, etc.). For example, a mobile device may correlate geo-tagged locations of one or more known wireless transmitters provided via a positioning tile, if applicable or available, with stored geo-tagged locations of one or more unknown wireless transmitters, such as approximated as a mobile device's location at the time of respective observations. Here a mobile device may, for example, use locations of one or more known wireless transmitters in a particular batch as proxies for locations of one or more unknown wireless transmitters in the batch, such as via an assumption that these may be located in a sufficiently close geographic proximity since their signals were observed at the same time. At times, to approximate unknown transmitter locations, a mobile device may, for example utilize a suitable proximity threshold that may account, for example, for a Euclidean distance between geo-coordinates of appropriate wireless transmitters, just to illustrate one possible implementation. Likewise, a proximity threshold may be determined, at least in part, experimentally and may be set, pre-defined, and/or configured (e.g., by a user, wireless service provider, etc.), for example, or otherwise dynamically defined in some manner depending on a particular environment, application, area, emergency and/or wireless service, mobile device, or the like. By way of example but not limitation, in one particular simulation or experiment, it has been observed that a proximity threshold between 5.0 and 10.0 meters may prove beneficial. Claimed subject matter is not limited to a particular approach, metric, and/or threshold, of course. Any other suitable proximity determination approaches, metrics, and/or thresholds may be used herein, in whole or in part, or otherwise considered.

According to an implementation, having estimated locations of one or more unknown but currently observed wireless transmitters, a mobile device may, for example, compute its position fix using one or more appropriate techniques. For example, at times, a position fix of a mobile device may be computed via trilateration based, at least in part, on locations of applicable wireless transmitters, such as determined via one or more approaches discussed above. In some instances, a position fix may, for example, be determined in connection with an observed time difference of arrival (OTDOA) technique in which a mobile device may employ one or more TOA or TDOA measurements from two or more pairs of applicable wireless transmitters, just to illustrate another possible implementation. Again, these or like positioning techniques are generally known and need not be described here in greater detail. Thus, utilizing one or more approaches discussed herein, a mobile device may, for example, be capable of computing a sufficient position fix even if no parameters of unknown wireless transmitters were provided in a positioning tile, which may prove beneficial, as was indicated. At times, a computed position fix and/or estimated locations of one or more previously unknown (e.g., to a server, etc.) wireless transmitters may, for example, be provided to a location or other suitable server via an appropriate message, such as for purposes of updating one or more applicable positioning tiles, facilitating and/or supporting E911 or like positioning, or the like, as was also discussed.

Figure 4:
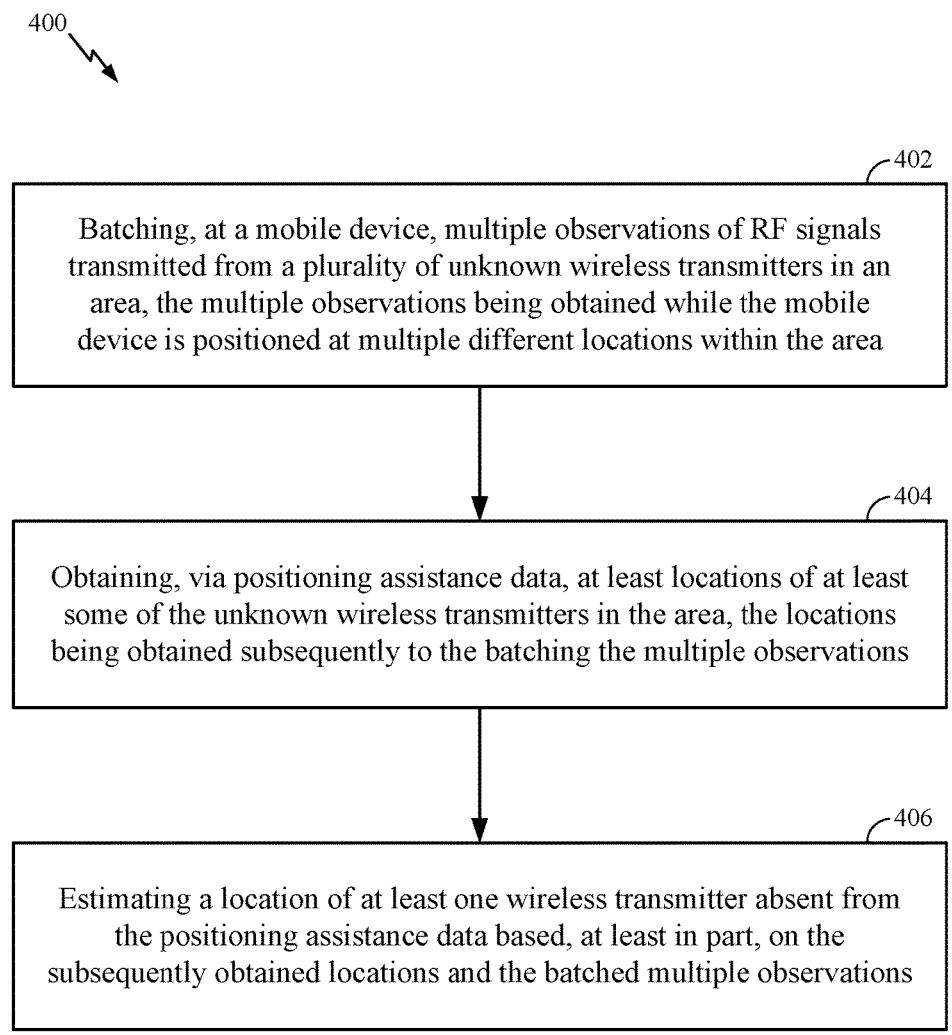
FIG. 4 is a flow diagram illustrating another implementation of an example process that may be performed to facilitate and/or support enhancing positioning via measurement batching.

Attention is now drawn to FIG. 4, which is a flow diagram illustrating an implementation of another example process, referenced herein at 400, that may be performed, in whole or in part, to facilitate and/or support one or more operations and/or techniques for enhancing positioning via measurement batching for use in or with a location-aware mobile device, such as mobile device 102 of FIG. 1, for example. Likewise, it should be noted that information acquired or produced, such as, for example, input signals, output signals, operations, results, etc. associated with example process 400 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

Example process 400 may, for example, begin at operation 402 with batching multiple observations of radio frequency (RF) signals transmitted from a plurality of unknown wireless transmitters in an area, the multiple observations being obtained while the mobile device is positioned at multiple different locations within the area, such as implemented via one or more operations and/or techniques discussed herein. With regard to operation 404, at least locations of at least some of the unknown wireless transmitters in the area may, for example, be obtained, such as via positioning assistance data, as one possible example, the locations being obtained subsequently to the batching the multiple observations, such as also implemented via one or more operations and/or techniques discussed herein. At operation 406, a location of at least one wireless transmitter absent from the positioning assistance data may, for example, be estimated based, at least in part, on the subsequently obtained locations and the batched multiple observations, such as further implemented via one or more operations and/or techniques discussed herein.

Figure 5:
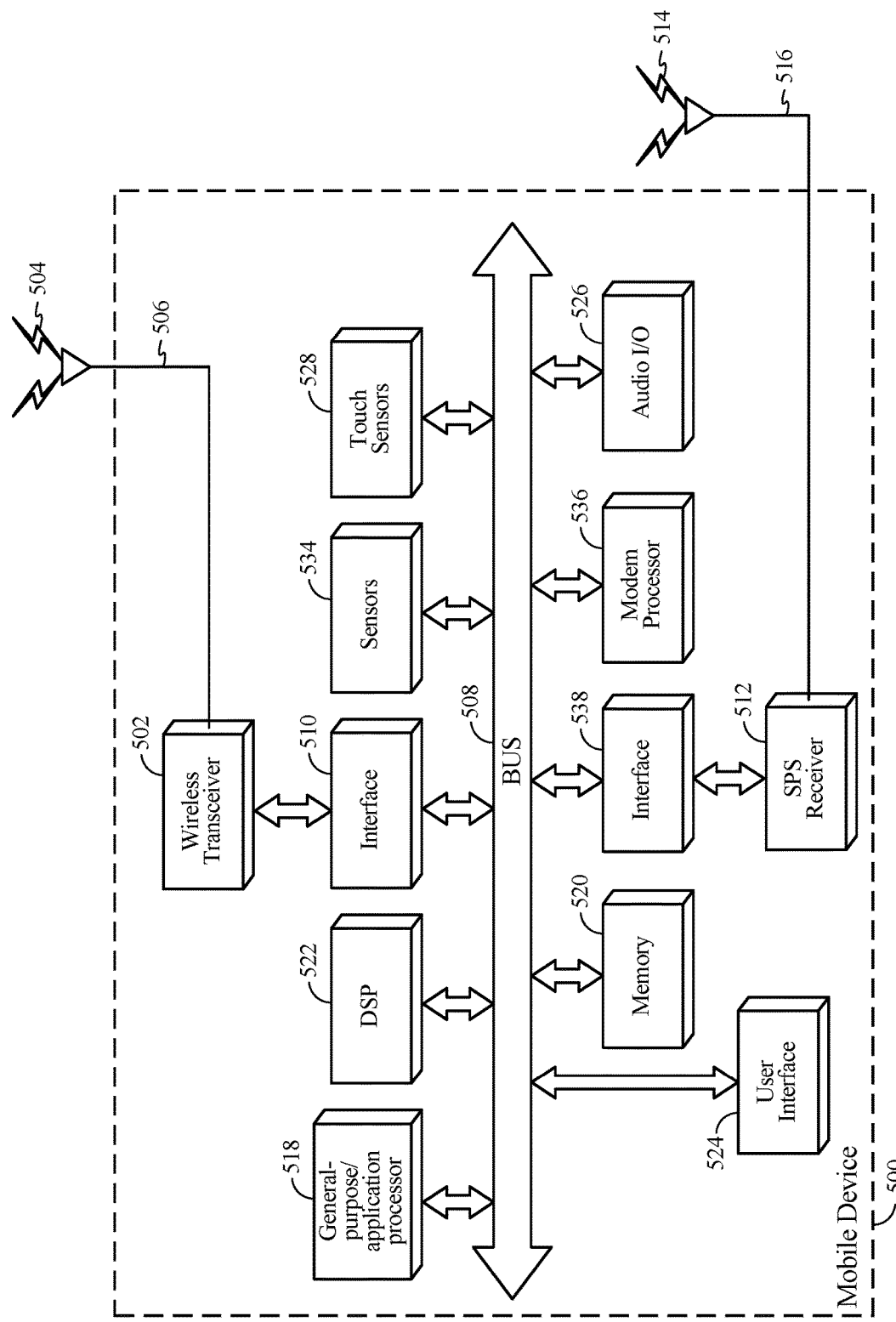
FIG. 5 is a schematic diagram illustrating an implementation of an example computing environment associated with a mobile device.

FIG. 5 is a schematic diagram of an implementation of an example computing environment associated with a mobile device that may be used, at least in part, to facilitate and/or support one or more operations and/or techniques for enhancing positioning via measurement batching. An example computing environment may comprise, for example, a mobile device 500 that may include one or more features or aspects of mobile device 102 of FIG. 1, though claimed subject matter is not so limited. For example, in some instances, mobile device 500 may comprise a wireless transceiver 502 capable of transmitting and/or receiving wireless signals, referenced generally at 504, such as via an antenna 506 over a suitable wireless communications network. Wireless transceiver 502 may, for example, be capable of sending or receiving one or more suitable communications, such as with reference to FIGS. 1-4. Wireless transceiver 502 may, for example, be coupled or connected to a bus 508 via a wireless transceiver bus interface 510. Depending on an implementation, at times, wireless transceiver bus interface 510 may, for example, be at least partially integrated with wireless transceiver 502. Some implementations may include multiple wireless transceivers 502 or antennas 506 so as to enable transmitting or receiving signals according to a corresponding multiple wireless communication standards such as WLAN or WiFi, Code Division Multiple Access (CDMA), Wideband-CDMA (W-CDMA), Long Term Evolution (LTE), Bluetooth®, just to name a few examples.

In an implementation, mobile device 500 may, for example, comprise an SPS or like receiver 512 capable of receiving or acquiring one or more SPS or other suitable wireless signals 514, such as via an SPS or like antenna 516. SPS receiver 512 may process, in whole or in part, one or more acquired SPS signals 514 for estimating a location of mobile device 500, rough or otherwise. In some instances, one or more general-purpose/application processors 518 (henceforth referred to as "processor"), memory 520, digital signal processor(s) (DSP) 522, or like specialized devices or processors not shown may be utilized to process acquired SPS signals 514, in whole or in part, calculate a location of mobile device 500, such as in conjunction with SPS receiver 512, or the like. Storage of SPS or other signals for implementing one or more positioning operations, such as in connection with one or more operations and/or techniques for improving OTDOA positioning via one or more local wireless transmitters, for example, may be performed, at least in part, in memory 520, suitable registers and/or buffers (not shown). Although not shown, it should be appreciated that in at least one implementation one or more processors 518, memory 520, DSPs 522, or like specialized devices or processors may comprise one or more processing modules capable of storing observations of radio frequency (RF) signals transmitted from one or more wireless transmitters in an area, the observations being stored based, at least in part, on one or more associations between the observations; and processing the observations to obtain an estimate of a location of mobile device 500 based, at least in part, on the one or more associations and responsive to a request for the estimate occurring subsequent to the storing the observations.

It should be noted that all or part of one or more processing modules may be implemented using or otherwise including hardware, firmware, software, or any combination thereof. Processing modules may be representative of one or more circuits capable of performing at least a portion of information computing technique or process. By way of example but not limitation, processor 518 or DSP 522 may include one or more processors, controllers, microprocessors, microcontrollers, application specific integrated circuits, digital signal processors, programmable logic devices, field programmable gate arrays, central processing units, graphics processor units, or the like, or any combination thereof. Thus, at times, processor 518 or DSP 522 or any combination thereof may comprise or be representative of means for means for storing observations of radio frequency (RF) signals transmitted from one or more wireless transmitters in an area, the observations being stored based, at least in part, on one or more associations between the observations, such as to implement operation 202 of FIG. 2, at least in part. In addition, in at least one implementation, processor 518 or DSP 522 may be representative of or comprise, for example, means for processing the observations to obtain an estimate of a location of mobile device 500 based, at least in part, on the one or more associations and responsive to a request for the estimate occurring subsequent to the storing the observations, such as to implement operation 204 of FIG. 2, at least in part. Also, in at least one implementation, processor 518 or DSP 522 may be representative of or comprise, for example, means for accessing the local memory to retrieve at least one of the one or more measurement batches via correlating the observations with one or more subsequent observations of the one or more wireless transmitters in the area, such as to implement operation 204 of FIG. 2, at least in part.

Further, processor 518 or DSP 522 or any combination thereof may comprise or be representative of means for batching, at mobile device 500, multiple observations of RF signals transmitted from a plurality of unknown wireless transmitters in an area, the multiple observations being obtained while mobile device 500 is positioned at multiple different locations within the area, such as to implement operation 402 of FIG. 4, at least in part. In addition, in at least one implementation, processor 518 or DSP 522 may be representative of or comprise, for example, means for obtaining, via positioning assistance data, at least locations of at least some of the unknown wireless transmitters in the area, the locations being obtained subsequently to the batching the multiple observations, such as to implement operation 404 of FIG. 4, at least in part. Also, in at least one implementation, processor 518 or DSP 522 may be representative of or comprise, for example, means for estimating a location of at least one wireless transmitter absent from the positioning assistance data based, at least in part, on the subsequently obtained locations and the batched multiple observations, such as to implement operation 406 of FIG. 2, at least in part.

As illustrated, DSP 522 may be coupled or connected to processor 518 and memory 520 via bus 508. Although not shown, in some instances, bus 508 may comprise one or more bus interfaces that may be integrated with one or more applicable components of mobile device 500, such as DSP 522, processor 518, memory 520, or the like. In various embodiments, one or more operations or functions described herein may be performed in response to execution of one or more machine-readable instructions stored in memory 520, such as on a computer-readable storage medium, such as RAM, ROM, FLASH, disc drive, etc., just to name a few examples. Instructions may, for example, be executable via processor 518, one or more specialized processors not shown, DSP 522, or the like. Memory 520 may comprise a non-transitory processor-readable memory, computer-readable memory, etc. that may store software code (e.g., programming code, instructions, etc.) that may be executable by processor 518, DSP 522, or the like to perform operations or functions described herein.

Mobile device 500 may comprise a user interface 524, which may include any one of several devices such as, for example, a speaker, microphone, display device, vibration device, keyboard, touch screen, etc., just to name a few examples. In at least one implementation, user interface 524 may enable a user to interact with one or more applications hosted on mobile device 500. For example, one or more devices of user interface 524 may store analog or digital signals on memory 520 to be further processed by DSP 522, processor 518, etc. in response to input or action from a user. Similarly, one or more applications hosted on mobile device 500 may store analog or digital signals in memory 520 to present an output signal to a user. In some implementations, mobile device 500 may optionally include a dedicated audio input/output (I/O) device 526 comprising, for example, a dedicated speaker, microphone, digital to analog circuitry, analog to digital circuitry, amplifiers, gain control, or the like. It should be understood, however, that this is merely an example of how audio I/O device 526 may be implemented, and that claimed subject matter is not limited in this respect. As seen, mobile device 500 may comprise one or more touch sensors 528 responsive to touching or like pressure applied on a keyboard, touch screen, or the like.

Mobile device 500 may comprise one or more sensors 534 coupled or connected to bus 508, such as, for example, one or more inertial sensors, ambient environment sensors, or the like. Inertial sensors of sensors 544 may comprise, for example, one or more accelerometers (e.g., collectively responding to acceleration of mobile device 500 in one, two, or three dimensions, etc.), gyroscopes or magnetometers (e.g., to support one or more compass or like applications, etc.), etc., just to illustrate a few examples. Ambient environment sensors of mobile device 500 may comprise, for example, one or more barometric pressure sensors, temperature sensors, ambient light detectors, camera sensors, microphones, etc., just to name few examples. Sensors 534 may generate analog or digital signals that may be stored in memory 520 and may be processed by DSP 522, processor 518, etc., such as in support of one or more applications directed to positioning or navigation operations, wireless communications, radio heat map learning, video gaming or the like.

In a particular implementation, mobile device 500 may comprise, for example, a modem processor 536, dedicated or otherwise, capable of performing baseband processing of signals received or downconverted via wireless transceiver 502, SPS receiver 512, or the like. Similarly, modem processor 536 may perform baseband processing of signals to be upconverted for transmission via wireless transceiver 502, for example. In alternative implementations, instead of having a dedicated modem processor, baseband processing may be performed, at least in part, by processor 518, DSP 522, or the like. In addition, in some instances, an interface 538, although illustrated as a separate component, may be integrated, in whole or in part, with one or more applicable components of mobile device 500, such as bus 508 or SPS receiver 512, for example. Optionally or alternatively, SPS receiver 512 may be coupled or connected to bus 508 directly. It should be understood, however, that these are merely examples of components or structures that may perform baseband processing, and that claimed subject matter is not limited in this regard.

Figure 6:
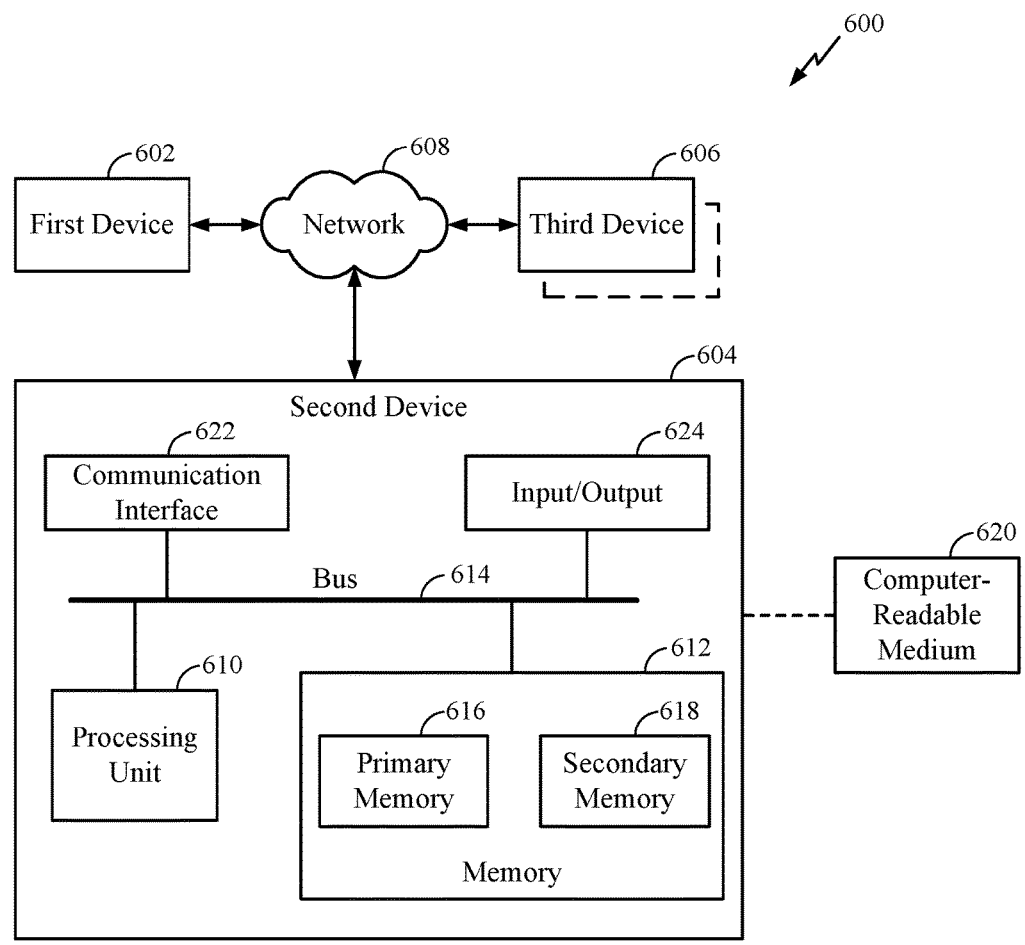
FIG. 6 is a schematic diagram illustrating an implementation of an example computing environment associated with a server.

FIG. 6 is a schematic diagram illustrating an implementation of an example computing environment or system 600 that may be associated with and/or include one or more servers and/or other devices capable of partially and/or substantially implementing and/or supporting one or more operations and/or techniques for enhancing positioning via measurement batching, such as discussed above in connection with FIGS. 1-5, for example. Computing environment 600 may include, for example, a first device 602, a second device 604, a third device 606, etc., which may be operatively coupled together via a communications network 608. In some instances, first device 602 may comprise a location server capable of providing positioning assistance data and/or associated parameters, such as, for example, identities, locations, etc. of wireless transmitters, radio heat map, base station almanac, database of wireless transmitters, bias estimates, signal measurements, reference transmitter parameters, neighbor transmitter parameters, positioning tiles, neighbor lists, or the like, such as discussed herein. For example, first device 602 may also comprise a server capable of providing an electronic digital map to a mobile device based, at least in part, on a rough estimate of a location of the mobile device (e.g., determined via last known SPS position fix, dead reckoning using one or more appropriate sensors, Cell ID, enhanced Cell ID, positioning tiles, etc.), upon request, or the like. First device 602 may also comprise a server capable of providing any other suitable positioning assistance data (e.g., a radio heat map, positioning tiles, etc.) relevant to a location of a mobile device, such as in a similar fashion. Second device 604 or third device 606 may comprise, for example, mobile devices, though claimed subject matter is not so limited. For example, in some instances, second device 604 may comprise a server functionally or structurally similar to first device 602, just to illustrate another possible implementation. In addition, communications network 608 may comprise, for example, one or more wireless transmitters, such as cellular base stations, Wi-Fi access points, femtocells, or the like. Of course, claimed subject matter is not limited in scope in these respects.

First device 602, second device 604, or third device 606 may be representative of any device, appliance, platform, or machine that may be capable of exchanging parameters and/or information over communications network 608. By way of example but not limitation, any of first device 602, second device 604, or third device 606 may include: one or more computing devices or platforms, such as, for example, a desktop computer, a laptop computer, a workstation, a server device, or the like; one or more personal computing or communication devices or appliances, such as, for example, a personal digital assistant, mobile communication device, or the like; a computing system or associated service provider capability, such as, for example, a database or information storage service provider/system, a network service provider/system, an Internet or intranet service provider/system, a portal or search engine service provider/system, a wireless communication service provider/system; or any combination thereof. Any of first, second, or third devices 602, 604, and 606, respectively, may comprise one or more of a mobile device, wireless transmitter or receiver, server, etc. in accordance with example implementations described herein.

In an implementation, communications network 608 may be representative of one or more communication links, processes, or resources capable of supporting an exchange of information between at least two of first device 602, second device 604, or third device 606. By way of example but not limitation, communications network 608 may include wireless or wired communication links, telephone or telecommunications systems, information buses or channels, optical fibers, terrestrial or space vehicle resources, local area networks, wide area networks, intranets, the Internet, routers or switches, and the like, or any combination thereof. As illustrated, for example, via a dashed lined box partially obscured by third device 606, there may be additional like devices operatively coupled to communications network 608. It is also recognized that all or part of various devices or networks shown in computing environment 600, or processes or methods, as described herein, may be implemented using or otherwise including hardware, firmware, software, or any combination thereof.

By way of example but not limitation, second device 604 may include at least one processing unit 610 that may be operatively coupled to a memory 612 via a bus 614. Processing unit 610 may be representative of one or more circuits capable of performing at least a portion of a suitable computing procedure or process. For example, processing unit 610 may include one or more processors, controllers, microprocessors, microcontrollers, application specific integrated circuits, digital signal processors, programmable logic devices, field programmable gate arrays, or the like, or any combination thereof. Although not shown, second device 604 may include a location-tracking unit that may initiate a position fix of a suitable mobile device, such as in an area of interest, for example, based, at least in part, on one or more received or acquired wireless signals, such as from an SPS, one or more cellular base stations, Wi-Fi access points, etc. In some implementations, a location-tracking unit may be at least partially integrated with a suitable processing unit, such as processing unit 610, for example, though claimed subject matter is not so limited. In certain server-based or server-supported implementations, processing unit 610 may, for example, comprise means for storing observations of radio frequency (RF) signals transmitted from one or more wireless transmitters in an area, the observations being stored based, at least in part, on one or more associations between the observations, such as to facilitate and/or support operations 202 and/or 204 of FIG. 2, at least in part. In some instances, processing unit 610 may, for example, comprise means for processing the observations to obtain an estimate of a location of a mobile device based, at least in part, on the one or more associations and responsive to a request for the estimate occurring subsequent to the storing the observations, such as to facilitate and/or support operations 202 and/or 204 of FIG. 2, at least in part. At times, processing unit 610 may, for example, comprise means for accessing the local memory to retrieve at least one of the one or more measurement batches via correlating the observations with one or more subsequent observations of the one or more wireless transmitters in the area, such as to facilitate and/or support operations 202 and/or 204 of FIG. 2, at least in part.

Further, in certain server-based or server-supported implementations, processing unit 610 may, for example, comprise means for batching, at a mobile device, multiple observations of RF signals transmitted from a plurality of unknown wireless transmitters in an area, the multiple observations being obtained while the mobile device is positioned at multiple different locations within the area, such as to facilitate and/or support operations 402, 404, and/or 406 of FIG. 4, at least in part. In some instances, processing unit 610 may, for example, comprise means for obtaining, via positioning assistance data, at least locations of at least some of the unknown wireless transmitters in the area, the locations being obtained subsequently to the batching the multiple observations, such as to facilitate and/or support operations 402, 404, and/or 406 of FIG. 4, at least in part. At times, processing unit 610 may, for example, comprise means for estimating a location of at least one wireless transmitter absent from the positioning assistance data based, at least in part, on the subsequently obtained locations and the batched multiple observations, such as to facilitate and/or support operations 402, 404, and/or 406 of FIG. 4, at least in part.

Memory 612 may be representative of any information storage mechanism or appliance. Memory 612 may include, for example, a primary memory 616 and a secondary memory 618. Primary memory 616 may include, for example, a random access memory, read only memory, etc. While illustrated in this example as being separate from processing unit 610, it should be understood that all or part of primary memory 616 may be provided within or otherwise co-located/coupled with processing unit 610. Secondary memory 618 may include, for example, same or similar type of memory as primary memory or one or more information storage devices or systems, such as, for example, a disk drive, an optical disc drive, a tape drive, a solid state memory drive, etc. In certain implementations, secondary memory 618 may be operatively receptive of, or otherwise configurable to couple to, a computer-readable medium 620. Computer-readable medium 620 may include, for example, any non-transitory storage medium that may carry or make accessible information, code, or instructions for one or more of devices in computing environment 600. Computer-readable medium 620 may also be referred to as a machine-readable medium, storage medium, or the like.

Second device 604 may include, for example, a communication interface 622 that may provide for or otherwise support an operative coupling of second device 604 to at least communications network 608. By way of example but not limitation, communication interface 622 may include a network interface device or card, a modem, a router, a switch, a transceiver, and the like. Second device 604 may also include, for example, an input/output device 624. Input/output device 624 may be representative of one or more devices or features that may be configurable to accept or otherwise introduce human or machine inputs, or one or more devices or features that may be capable of delivering or otherwise providing for human or machine outputs. By way of example but not limitation, input/output device 624 may include an operatively configured display, speaker, keyboard, mouse, trackball, touch screen, information port, or the like.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units de-signed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, messages, parameters, frames, packets, content and/or the like. It should be understood, however, that all of these and/or similar terms are to be associated with appropriate physical quantities or manifestations, and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. Likewise, operation of a memory device to store bits, values, elements, symbols, characters, terms, numbers, numerals, measurements, messages, parameters, frames, packets, content and/or the like may comprise a physical transformation. With particular types of memory devices, such a physical transformation may comprise a physical transformation of an article to a different state or thing. For example, but without limitation, for some types of memory devices, a change in state may involve an accumulation and/or storage of charge or a re-lease of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") net-work, a Single-Carrier Frequency Division Multiple Access ("SC-FDMA") net-work, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method, at a mobile device, comprising:
    batching multiple observations of radio frequency (RF) signals transmitted from a plurality of unknown wireless transmitters in an area based, at least in part, on one or more associations between the multiple observations and one or more sensor measurements obtained from one or more on-board inertial or environmental sensors, or a combination thereof, the multiple observations and the sensor measurements being obtained while the mobile device is at different locations within the area;
    obtaining, via positioning assistance data, at least locations of at least some of the unknown wireless transmitters in the area, the locations being obtained subsequently to the batching the multiple observations; and
    estimating a location of the at least one wireless transmitter absent from the positioning assistance data based, at least in part, on the subsequently obtained locations and the batched multiple observations.

2. The method of claim 1, wherein the plurality of unknown wireless transmitters comprise wireless transmitters locations of which are not known to the mobile device in the absence of the positioning assistance data.

3. The method of claim 1, wherein the batching comprises storing the multiple observations in one or more measurement batches in a local memory of the mobile device.

4. The method of claim 3, wherein the multiple observations are stored in the one or more measurement batches based, at least in part, on the different locations within the area.

5. The method of claim 4, wherein a particular measurement batch of the one or more measurement batches is stored with reference to at least one of: a particular location of the different locations within the area; a particular time period of obtaining the multiple observations; a particular parameter of the RF signals, or any combination thereof.

6. The method of claim 1, wherein the batching comprises determining the one or more associations between the multiple observations.

7. The method of claim 6, wherein the one or more associations comprise at least one of: a time-related association; a location-related association; a parameter-related association, or any combination thereof.

8. The method of claim 1, wherein the at least one wireless transmitter determined to be absent from the positioning assistance data comprises a wireless transmitter observed by the mobile device in the area subsequent to obtaining the positioning assistance data.

9. The method of claim 1, wherein the multiple observations comprise at least one of: a measured time of arrival (TOA) of the RF signals; a measured time difference of arrival (TDOA) of the RF signals; a received signal strength indicator (RSSI) measurement of the RF signals; a round-trip time (RTT) measurement of the RF signals; an identity of the one or more wireless transmitters, or any combination thereof.

10. The method of claim 1, wherein the positioning assistance data comprises a positioning tile covering at least a portion of the area.

11. The method of claim 1, and further comprising estimating a location of the mobile device in the area based, at least in part, on one or more subsequent observations of the RF signals in the area and the estimated location of the at least one wireless transmitter.

12. The method of claim 1, and further comprising transmitting the estimated location of the at least one wireless transmitter to a location server.

13. The method of claim 1, and further comprising storing the estimated location of the at least one wireless transmitter in a local memory of the mobile device.

14. An apparatus comprising:
    means for batching multiple observations of radio frequency (RF) signals transmitted from a plurality of unknown wireless transmitters in an area based, at least in part, on one or more associations between the multiple observations and one or more sensor measurements obtained from one or more on-board inertial or environmental sensors, or a combination thereof, the multiple observations and the one or more sensor measurements being obtained while a mobile device is at different locations within the area;
    means for obtaining, via positioning assistance data, at least locations of at least some of the unknown wireless transmitters in the area, the locations being obtained subsequently to the batching the multiple observations; and
    means for estimating the location of the at least one wireless transmitter absent from the positioning assistance data based, at least in part, on the subsequently obtained locations and the batched multiple observations.

15. The apparatus of claim 14, wherein the means for the batching comprise means for determining the one or more associations between the multiple observations.

16. An apparatus comprising:
    a communication interface coupled to a receiver of a mobile device to communicate with an electronic communications network and one or more processors coupled to a memory and to the communication interface, the communication interface and the one or more processors configured to:
        batch multiple observations of radio frequency (RF) signals transmitted from a plurality of unknown wireless transmitters in an area based, at least in part, on one or more associations between the multiple observations and one or more sensor measurements obtained from one or more on-board inertial or environmental sensors, or a combination thereof, the multiple observations and the one or more sensor measurements being obtained while the mobile device is at different locations within the area;

obtain, via positioning assistance data, at least locations of at least some of the unknown wireless transmitters in the area, the locations being obtained subsequently to the batching the multiple observations; and estimate a location of the at least one wireless transmitter absent from the positioning assistance data based, at least in part, on the subsequently obtained locations and the batched multiple observations.

17. The apparatus of claim 16, wherein the plurality of unknown wireless transmitters comprise wireless transmitters locations of which are not known to the mobile device in the absence of the positioning assistance data.

18. The apparatus of claim 16, wherein the one or more processors further to store the multiple observations in one or more measurement batches in a local memory of the mobile device.

19. The apparatus of claim 18, wherein the one or more processors further to store the multiple observations in the one or more measurement batches based, at least in part, on the different locations within the area.

20. The apparatus of claim 19, wherein a particular measurement batch of the one or more measurement batches is stored with reference to at least one of: a particular location of the different locations within the area; a particular time period of obtaining the multiple observations; a particular parameter of the RF signals, or any combination thereof.

21. The apparatus of claim 16, wherein the one or more processors further to determine the one or more associations between the multiple observations.

22. The apparatus of claim 21, wherein the one or more associations comprise at least one of: a time-related association; a location-related association; a parameter-related association, or any combination thereof.

23. The apparatus of claim 16, wherein the at least one wireless transmitter determined to be absent from the positioning assistance data comprises a wireless transmitter observed by the mobile device in the area subsequent to obtaining the positioning assistance data.

24. The apparatus of claim 16, wherein the multiple observations comprise at least one of: a measured time of arrival (TOA) of the RF signals; a measured time difference of arrival (TDOA) of the RF signals; a received signal strength indicator (RSSI) measurement of the RF signals; a round-trip time (RTT) measurement of the RF signals; an identity of the one or more wireless transmitters, or any combination thereof.

25. The apparatus of claim 16, wherein the positioning assistance data comprises a positioning tile covering at least a portion of the area.

26. The apparatus of claim 16, wherein the one or more processors further to estimate a location of the mobile device in the area based, at least in part, on one or more subsequent observations of the RF signals in the area and the estimated location of the at least one wireless transmitter.

27. The apparatus of claim 16, wherein the one or more processors further to transmit the estimated location of the at least one wireless transmitter to a location server.

28. The apparatus of claim 16, wherein the one or more processors further to store the estimated location of the at least one wireless transmitter in a local memory of the mobile device.

29. A non-transitory storage medium having instructions executable by a processor to:

batch multiple observations of radio frequency (RF) signals transmitted from a plurality of unknown wireless transmitters in an area based, at least in part, on one or more associations between the multiple observations and one or more sensor measurements obtained from one or more on-board inertial or environmental sensors, or a combination thereof, the multiple observations and the one or more sensor measurements being obtained while a mobile device is at different locations within the area;

obtain, via positioning assistance data, at least locations of at least some of the unknown wireless transmitters in the area, the locations being obtained subsequently to the batching the multiple observations; and estimate the location of the at least one wireless transmitter absent from the positioning assistance data based, at least in part, on the subsequently obtained locations and the batched multiple observations.

30. The non-transitory storage medium of claim 29, wherein the processor to determine the one or more associations between the multiple observations.

* * * * *